United States Patent
DeFerrari

(10) Patent No.: US 9,403,414 B2
(45) Date of Patent: Aug. 2, 2016

(54) AMPHIBIOUS BOARD

(71) Applicant: Daniel Laurence DeFerrari, Havelock, NC (US)

(72) Inventor: Daniel Laurence DeFerrari, Havelock, NC (US)

(73) Assignee: Daniel Laurence DeFerrari, Havelock, NC (US)

( * ) Notice: Subject to any disclaimer, the term of this patent is extended or adjusted under 35 U.S.C. 154(b) by 0 days.

(21) Appl. No.: 14/539,149

(22) Filed: Nov. 12, 2014

(65) Prior Publication Data
US 2016/0129743 A1    May 12, 2016

(51) Int. Cl.
| | |
|---|---|
| *A63C 17/01* | (2006.01) |
| *B60F 3/00* | (2006.01) |
| *B63B 35/79* | (2006.01) |
| *B63B 35/81* | (2006.01) |
| *A63C 17/26* | (2006.01) |

(52) U.S. Cl.
CPC .................. *B60F 3/003* (2013.01); *A63C 17/01* (2013.01); *A63C 17/262* (2013.01); *B63B 35/7906* (2013.01); *B63B 35/7926* (2013.01); *B63B 35/812* (2013.01); *B63B 2035/813* (2013.01); *B63B 2035/818* (2013.01)

(58) Field of Classification Search
CPC .... B63C 13/00; B63B 35/795; A63C 17/267; A63C 17/262
See application file for complete search history.

(56) References Cited

U.S. PATENT DOCUMENTS

| | | | | |
|---|---|---|---|---|
| 3,403,919 A | * | 10/1968 | Weibling | A63C 5/035 280/11.221 |
| 5,348,327 A | * | 9/1994 | Gieske | B63B 35/7946 114/344 |
| 7,441,787 B1 | * | 10/2008 | Jordan | A63C 17/006 280/842 |
| 2013/0328280 A1 | * | 12/2013 | Meyer | B63B 35/795 280/87.042 |

\* cited by examiner

*Primary Examiner* — Edwin Swinehart

(57) ABSTRACT

The purpose of this invention; herein the Amphibious Board; is to allow a person to transition from a body of water to land & vice versa. The method attributable to provide enough energy is derived from a person or rider, holding a controllable kite utilizing the power of the wind. Once standing in the foot the bindings, the rider would be able to steer the Amphibious Board with the aid of the fins located on the bottom of the board in the water; and the rollers would allow the rider to access the land.

1 Claim, 1 Drawing Sheet

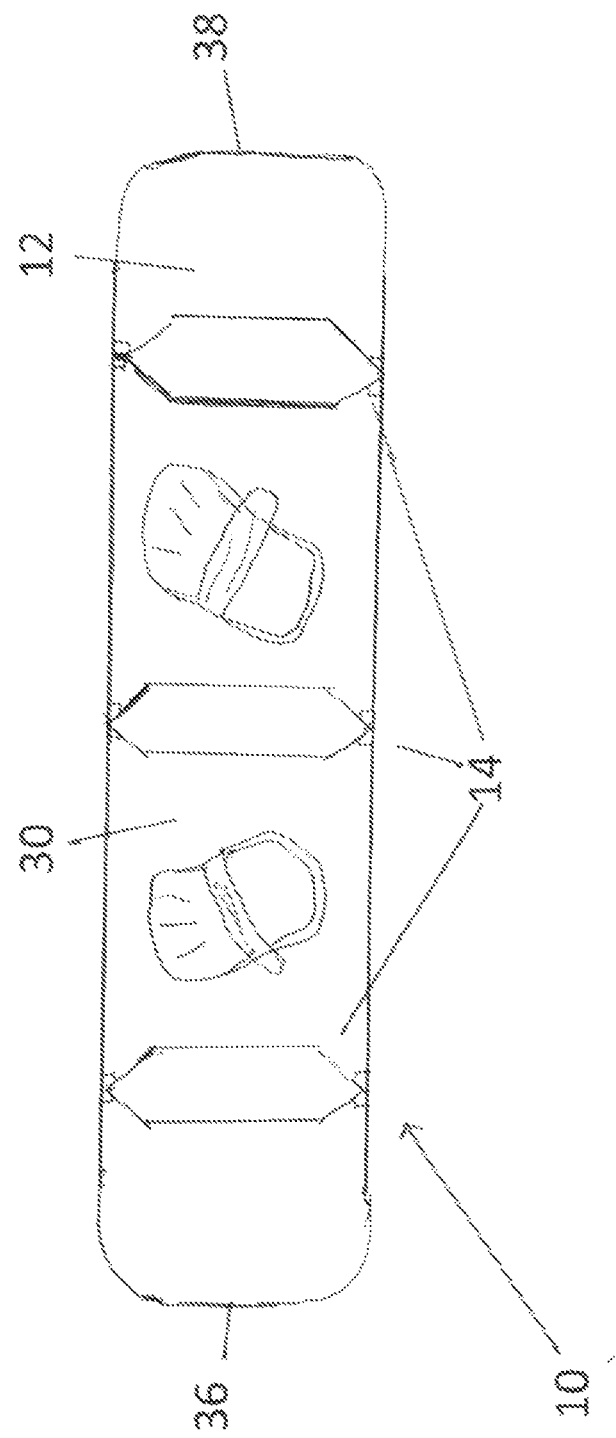
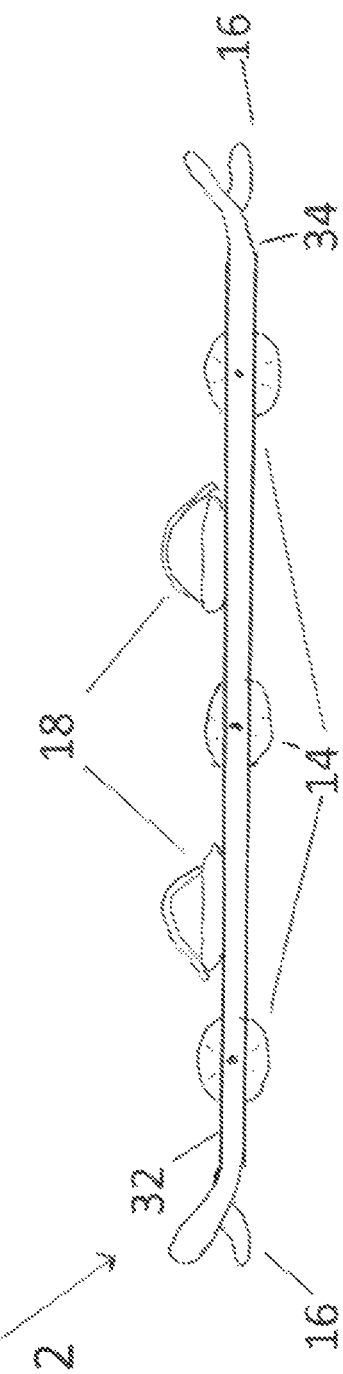
Figure # 1
Figure # 2

AMPHIBIOUS BOARD

BACKGROUND OF THE INVENTION

The present invention relates to gliding boards and, more particularly, a amphibious gliding board suited for both land and water use.

Currently, waterboards cannot mechanically transition from the water to the land and vice versa. Likewise, a land-based board, such as a skateboard, cannot mechanically transition from the land to the water and vice versa.

As can be seen, there is a need for a gliding board mechanically adapted to transition from water to land, and vice versa.

DESCRIPTION OF THE DRAWINGS

FIG. 1 is a plan view of exemplary embodiment of the present invention; and

FIG. 2 is a side view of exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the present invention.

Broadly, an embodiment of the present invention provides an amphibious board. The amphibious board may include a glide board, a plurality of rollers, a pair of foot bindings and a plurality of fins. The plurality of rollers may be rotatably mounted to the glide board to provide rolling motion over the land surface. The plurality of fins may be attached to and protruding from the bottom surface so as to control the direction of the amphibious board when moving over or through a body of water.

Referring now to FIGS. 1 and 2, the present invention may include an amphibious board 10. The amphibious board 10 may include a glide board 12, a plurality of rollers 14, a pair of footing bindings 18 and a plurality of fins 16.

The glide board 12 may include a body 30 having a deck surface 32, a bottom surface 34, a stern 36 and a bow 38. The body 30 may include a shape and appreciable thickness for rigidity, buoyancy and strength when traveling on land and sea.

The plurality of fins 16 may be attached to and protruding from the bottom surface 34 so as to control the direction of the amphibious board 10 when moving over or through a body of water.

The pair of foot bindings 18 may be adapted to removably secure at least one foot of a user to the glide board 12 so that the user may control the direction and movement of the amphibious board 10 when traveling on land and sea.

The plurality of rollers 14 may be rotatably mounted to the glide board 12 so as to extend normal to a line extending from the stem 36 to the bow 38. In certain embodiments, the plurality of rollers 14 may be integrally rotatably mounted to the body 30 during fabrications. In an alternate embodiment, the plurality of rollers 14 may be attached to a pre-existing waterboard a user desires to convert into an amphibious board 10. The plurality of rollers 14 may be adapted to provide rolling motion over the land surface, such as beach, asphalt or the like, so that the plurality of fins 16 are above the land surface.

The bottom surface 34 may be adapted to move over or through the body of water. The deck surface 32 may be adapted to be ridden on when the bottom surface 34 is moving over or through a body of water and adapted to be ridden on when the plurality of rollers 14 are rolling over the land surface.

A method of using the present invention may include the following. The amphibious board 10 disclosed above may be provided. A user may secure at least one foot in at least one of the pair of foot bindings 18. The user may employ a kite, or the like, operated so as to convert wind energy into kinetic energy of the glide board 12 when moving over or through a body of water and when amphibious board 10 transitions to the plurality of rollers 14 as the glide board 12 moves over a land surface.

It should be understood, of course, that the foregoing relates to exemplary embodiments of the invention and that modifications may be made without departing from the spirit and scope of the present invention.

What is claimed is:
1. An amphibious board comprising:
A glide board having a deck surface and a bottom surface;
A pair of foot bindings on the deck surface;
A plurality of rollers permanently mounted integrally into the board's structure extending above and below the deck's surface providing a rolling motion over a land surface;
And a plurality of fins attached to and protruding from the bottom surface to control the direction of the amphibious board when moving over or through a body of water; angled and offset on each end of the board, as to not contact surface when traveling on land.

* * * * *